March 20, 1962    L. J. STUCKENS    3,025,778
PHOTOCOPY APPARATUS AND DOCUMENT CARRIER FOR SAME
Filed Jan. 12, 1959
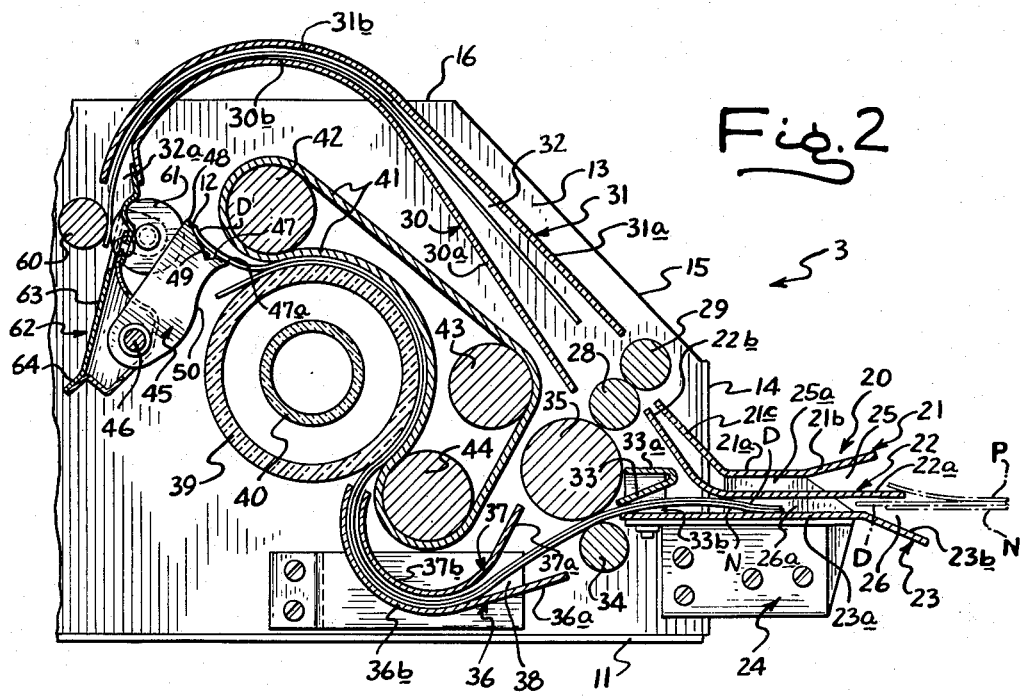
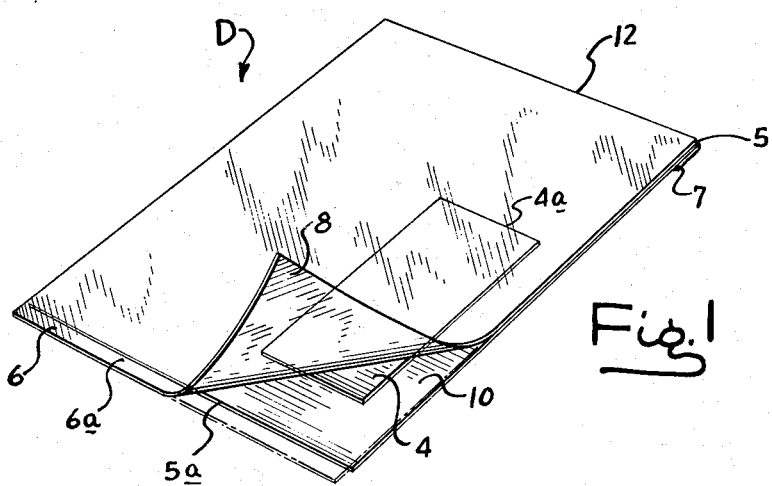
INVENTOR
LEO J. STUCKENS
by: ATTY.

United States Patent Office 3,025,778
Patented Mar. 20, 1962

3,025,778
PHOTOCOPY APPARATUS AND DOCUMENT
CARRIER FOR SAME
Leo J. Stuckens, Ingleside, Ill., assignor to American Photocopy Equipment Company, Evanston, Ill., a corporation of Illinois
Filed Jan. 12, 1959, Ser. No. 786,104
3 Claims. (Cl. 95—75)

This invention relates generally to photocopy accessories and more specifically to a device for facilitating the photocopying of small or very thin documents.

Generally, in photocopying a document, the surface to be copied is placed in face-to-face contact with the photo-sensitive surface of a negative sheet, and the two are exposed to light thereby producing a latent photographic image in the negative. A conventional manually operated exposure means generally comprises a light source underlying a light transmitting planar member which may be curved or flat and upon which the superimposed negative and document are laid during the exposure process. Very often, in the processing of documents having a relatively small area compared to that of the negative sheet, it is extremely difficult to maintain the document in a stationary predetermined superimposed position with relation to the negative. In the absence of some means for holding the documents in its original emplaced position, slipping thereof is very likely to occur in the course of the handling incident to the exposure process or during the process itself. The latter is particularly true where the light-transmitting member is curved. The problem becomes even more acute when it is desired to expose a number of relatively small documents on the one relatively large negative sheet.

Elimination of this difficulty is one of the primary objects of the present invention which comprises a pair of suitably sized flexible planar members, one of which is transparent, swingably attached along a respective edge of each. Small documents are inserted between the members with the copy surfaces engaging the transparent member. The documents are held in frictional engagement between the members and will not move from their original emplaced positions. The transparent member of the carrier is placed in face-to-face contact with the negative for the exposure process. In area the carrier corresponds to that of the conventional photocopy negative sheet thereby facilitating ready alignment of the two and maintenance of the alignment during the exposure process. Since the documents are being held in position within the carrier they are also maintained in stationary relation with respect to the negative.

Small documents present another problem when they are to be exposed in the faster automatic devices in which superimposed document and negative sheet are automatically conveyed past exposure means. These devices or machines generally have an opening for receiving a negative sheet and a document in superimposed relation and further comprise guide members which direct the superimposed document and negative sheet to conveying means. However, in order to be processed through the automatic exposure device, a document must possess a minimum length sufficient to span the distance along the guide members between the opening and the conveying means. Many documents are not suitable for processing through this type of machine because they are not long enough to bridge this distance.

The prior art, as heretofore practiced, sought to overcome this problem by fastening the short document to a carrier sheet having the required length. This method, however, necessitates two extra time-consuming steps. The short document must be fastened to the carrier sheet prior to introduction into the machine, and then, upon ejection from the machine, it must be unfastened from this sheet.

The subject carrier is sufficiently lengthy and also eliminates the bothersome fastening and unfastening steps. All that is necessary to prepare the short document for processing through the machine is to slip the document between the two members where it is held in frictional engagement while it is being processed. After processing, the cover member is raised and the document simply slipped out from atop the back member.

This carrier is also ideally suited for simultaneously photocopying several comparatively small document sheets, such as checks, with a minimum of bother. Instead of laboriously attaching each check, a plurality of checks are merely slipped into the comparatively large subject carrier.

After the superimposed negative sheet and document holding carrier have passed through the opening and the guideway of the machine, they are carried by the conveying means past exposure means, following which the document carrier is separated from the negative sheet which must undergo further processing. Separation may be either manual or automatic, depending upon the type of machine employed. In fully automatic photocopy machines which successively perform both the exposure and development steps, separation is automatic.

The subject carrier also eliminates difficulties arising when very thin documents, such as air mail paper, are processed in fully automatic photocopy machines embodying automatic sheet separators actuable in response to the thrust of a moving document to perform the separation. These difficulties are separate and distinct from those arising in the processing of small documents, and the service performed by the subject carrier in connection with thin documents is distinct from that performed in connection with small documents.

Under most circumstances, thin documents do not possess the rigidity necessary to exert the thrust required to actuate the separator. The back member of the subject carrier does possess sufficient rigidity to exert the required thrust and by carrying the thin document within the subject carrier during processing the aforementioned separation difficulties are eliminated.

Furthermore, utilization of the new carrier with the aforementioned type of photocopy machine enables reproduction of the entire document from leading edge to trailing edge. In the use of machines having the type of automatic separator described, the document and negative sheet must be superimposed with the front edge of the document leading the front edge of the negative sheet by approximately one-quarter (¼) of an inch. Providing such a lead is necessary to enable the sheet separator or kicker to be deflected and thereby separate the document from the negative sheet and guide the document along a path different than that to be followed by the trailing negative sheet. As a result, the leading quarter of an inch of the document cannot be reproduced because it projects beyond the negative sheet.

This difficulty can be avoided by merely placing the document within the aforementioned carrier a sufficient distance back from the leading edge thereof so that the leading edges of the document and negative sheet are aligned, thus assuring reproduction of the entire document.

Therefore, it is a primary object of this invention to provide improved means for facilitating the photocopying of documents which are small and/or thin.

A further object of this invention is to provide improved means for facilitating the photocopying of several small documents simultaneously.

Another object of this invention is to provide means for reproducing in its entirety a document processed through an automatic photocopy machine embodying a sheet separator actuable in response to exertion of a thrust thereagainst.

Still another object of this invention is to provide means adapting very thin documents for use with an automatic photocopy machine embodying a sheet separator of the aforementioned type.

Other objects and advantages are inherent in the structure claimed and disclosed or will become apparent to those skilled in the art from the following detailed description in connection with the accompanying drawings wherein:

FIG. 1 is a perspective view of the subject carrier.

FIG. 2 is a fragmentary vertical sectional view of a portion of a fully automatic photocopy machine embodying a sheet separator actuable in response to exertion of a thrust thereagainst, showing superimposed document carrier and negative sheet undergoing separation.

Referring first to FIG. 1 the reference letter D indicates generally a document carrier comprising a rectangular flexible planar paper back member 10 normally covered by a liftable transparent rectangular sheet 8, such as a sheet of mylar film. The front end 7 of transparent sheet 8 is folded over and fastened behind a corresponding end 5 of back member 10. The opposite end 6 of sheet 8 extends rearwardly beyond the corresponding end 5a of back member 10 by a slight amount when the two sheets are superimposed so as to provide a projecting marginal portion 6a which may be grasped by the operator to lift sheet 8 away from back member 10 when it is desired to insert or remove one or more documents.

In order to utilize carrier D, sheet 8 is raised, as indicated in FIG. 1, and a document 4 is inserted with the rear surface thereof atop back member 10. Depending upon their size with relation to back member 10, several documents may be inserted thereupon simultaneously. Transparent sheet 8 is then dropped over document 4 which is thus frictionally held between sheet 8 and member 10, and document-holding carrier D is ready for the exposure process.

A portion of a fully automatic photocopy machine embodying a sheet separator actuable in response to a thrust thereagainst is shown in FIG. 2 and is designated generally by the reference numeral 3. The above described carrier is intended to be used in conjunction with manually operated exposure means and with automatic exposure devices requiring manual separation of negative sheet and carrier as well as with fully automatic machines of the type shown in FIG. 2. The cooperation occurring between the manually operated exposure means and the subject carrier also occurs between the automatic exposure device and the carrier. However, there is additional cooperation between the automatic device and the carrier not occurring in the use of the manually operated means. Similarly, the cooperation occurring between the automatic exposure device and the subject carrier also occurs between the fully automatic photocopy machine and the carrier. However, there is additional cooperation between the photocopy machine and the subject carrier not occurring in the use of the exposure device. That is, the subject carrier is most advantageous when used with the fully automatic photocopy machine and enjoys greater utility than when used with either of the exposure devices. Consequently, the fully automatic machine is shown for purposes of illustration.

Photocopy machine 3 has a horizontal planar base member 11 of approximately rectangular configuration. Fixedly secured to base member 11 and extending upwardly therefrom are a pair of spaced parallel walls, only one of which is shown at 13. Wall 13 has a substantially vertical front edge 14 leading to a rearwardly inclined edge 15 which extends to an upper horizontal edge 16. Supported between wall 13 and the parallel wall (not shown) are a number of elements to be subsequently described.

At the front of the machine (to the right as viewed in FIG. 2) there is a sheet inlet means indicated generally by the reference numeral 20 and comprising a plurality of vertically spaced guide plates 21, 22, 23 fixedly secured to supporting means indicated generally by the reference numeral 24. The uppermost guide plate 21 comprises a rearwardly and downwardly inclined portion 21b integral with a horizontal intermediate portion 21a which is in turn integral with an upwardly inclined portion 21c. The middle guide plate 22 comprises a horizontal portion 22a integral with a rearwardly upwardly inclined portion 22b. The lowermost guide plate 23 comprises an upwardly rearwardly inclined portion 23b integral with a horizontally extending portion 23a.

The negative sheet is designated by the reference letter N, and the positive sheet which eventually becomes the final photocopy product is designated by the reference letter P. The sheets N and P together with carrier D are fed into the apparatus by the operator in the following manner: The operator first places the three together in contacting superimposed relation with the positive sheet P, uppermost, the negative sheet N lowermost, and the carrier D, sandwiched therebetween. The photosensitive face of negative sheet N is placed in face-to-face contact with transparent sheet 8 of carrier D which is positioned so that its leading edge 12 extends preferably about one-quarter inch beyond the leading edges of negative sheet N and positive sheet P. This lead is preferably at least about 3/16 of an inch to actuate the separator mechanism, as will be explained below. The leading edge 4a of the document 4 carried within carrier D may be positioned at least the same distance back from the leading edge 12 of carrier D as is the leading edge of negative sheet N if it is desired to reproduce the entire area of document 4. Positive sheet P has its coated transfer receiving surface facing downwardly.

The operator then moves the stack toward the guide plates 21, 22, 23 until the leading edge 12 of carrier D is under the forward edge of middle guide plate 22. The stack is then raised upwardly so as to flip the leading edge of positive sheet P above the forward edge of plate 22, and then the stack is thrust forwardly to cause plate 22 to separate positive sheet P from the stack. Carrier D and negative sheet N remain in contacting relation until they are separated in the manner described below.

It will be seen that the space between uppermost guide plate 21, and middle guide plate 22 forms an inlet opening, indicated by the reference numeral 25 which leads into a guideway 25a. Similarly, the space between middle plate 22 and lowermost guide plate 23 provides an inlet opening 26 leading into a lower guideway 26a.

After positive sheet P is separated from the stack in the manner described above, the operator continues the rearwardly thrust so that the leading edge of positive sheet P moves through the upper guideway 25a and the superimposed contacting negative sheet N and carrier D travel through the lower guideway 26a. The guide plate portions 21c and 22b converge toward a pair of contacting rollers 28, 29 so as to cause positive sheet P to pass therebetween and be drivingly engaged by the rollers.

Secured to the parallel walls 13 and extending substantially entirely across the space therebetween are a pair of guide plates 30, 31 having upwardly rearwardly inclined portions 30a, 31a respectively, formed integral with parallel arcuate portions 30b, 31b. Guide plates 30, 31 cooperate to form a guideway 32 therebetween. The latter guides positive sheet P from the drive rollers 28, 29 rearwardly, upwardly and then downwardly out through an exit end 32a of guideway 32.

While the positive sheet P is travelling through the guideways 25a, 32 carrier D and negative sheet N will travel through the guideway 26a and will be directed by the rear edge of guide plate portion 23a and an auxiliary downwardly inclined guide plate 33 toward and between a second pair of rollers 34, 35. Guide plate 33 has integral therewith a horizontal flange 33a secured to a support member 33b mounted on support means 24. Adjacent rollers 34, 35 are a pair of guide plates 36, 37 having rearwardly and downwardly converging portions 36a, 37a respectively and upwardly curved arcuate portions 36b, 37b. It will be seen that the space between guide plates 36, 37 constitutes a guideway 38 for guiding negative sheet N and carrier D, as the latter two pass between and rearwardly from rollers 34, 35. Guideway 38 directs negative sheet N and carrier D to a well-known exposure means.

The exposure means comprises a hollow plastic or glass cylinder 39 which is preferably transparent or at least translucent. Cylinder 39 extends horizontally and longitudinally between the parallel walls 13 and is mounted for free rotational movement about its axis by any suitable mounting means (not shown) well-known to those in the art. Extending axially through cylinder 39 is a fluorescent tube or other light source 40. A conventional flexible rubber or plastic belt 41 extends around a segment of the exterior surface of cylinder 39 and in contact therewith. Belt 41 is continuous and extends around three rollers 42, 43, 44 and is kept under tension.

It will be seen that as the rollers 42, 43, 44 are drivingly rotated (by conventional means not shown) belt 41 travels in contact with cylinder 39 in a counter-clockwise direction about the axis of the latter. This movement of the belt 41 will also cause corresponding rotation of cylinder 39 by virtue of the latter's engagement with belt 41. Guideway 38 will direct negative sheet N and carrier D from rollers 34, 35 to the initial point of tangency of cylinder 39 and belt 41 whereupon N and D will be gripped between cylinder 39 and belt 41 and carried therebetween in a counter-clockwise direction about the axis of cylinder 39 through the entire path of contact of belt 41 and cylinder 39.

It should be noted that in order to be driven through the sequence previously described, a document which is not being carried within carrier D must possess a minimum length exceeding the distance along guideway 38 between the point of contact of rollers 34, 35 and the point of tangency of belt 41 and cylinder 39. Carrier D possesses this minimum length. Any document which does not possess this length cannot alone be processed through the photocopy machine, but must first be inserted within carrier D in the manner described.

At this point it should be noted that in the automatic exposure device the superimposed negative sheet N and document 4 (or document-holding carrier D) are inserted directly into a guideway corresponding to guideway 38 in FIG. 2. That is, the positive sheet P need not be employed until after the other two sheets have left the machine upon completion of the exposure step. That portion of the fully automatic machine shown in FIG. 2 through which the sheets and carrier have passed prior to guideway 38 would not be present in the automatic exposure device.

When a document is processed through the automatic exposure device it must posses a minimum length exceeding the distance between the front end of the receiving guideway and the point of tangency of the initial sheet driving means such as the conveying belt and the exposure cylinder. If the document is shorter than this minimum length, carrier D should be used.

During the interval in which the superimposed sheets are conveyed through the path of contact of belt 41 and cylinder 39, light rays from the light source 40 will radiate outwardly so as to be transmitted through the transparent or translucent cylindrical wall of cylinder 39, through the negative sheet N and the transparent sheet 8 of carrier D (FIG. 1) and then against the image bearing front face of the carried document 4 (FIG. 1) from which the light rays will be reflected back through transparent sheet 8 to the photo-sensitive layer coated on the front face of negative sheet N and thereby produce a latent photographic image in negative sheet N by the so-called "reflex" method.

Following the exposure step in the automatic exposure device, superimposed negative sheet N and carrier D are ejected from the machine and separated manually. In the fully automatic photocopy machine shown in FIG. 2, superimposed sheet N and carrier D are automatically separated after exposure by a separator or kicker 45.

Separator 45 is mounted for free rotational movement on a horizontal shaft 46 and has a forward edge (to the right in FIG. 2) which comprises an arcuate surface 47 intersecting with another surface 48 angularly inclined with respect thereto to form a recess or notch 49.

The center of gravity of separator 45 is located forwardly (to the right in FIG. 2) of shaft 46 so that separator 45 will be normally positioned with the forward end 47a of surface 47 resting upon the exterior surface of cylinder 39. As carrier D and negative sheet N travel outwardly and rearwardly from between belt 41 and cylinder 39, leading edge 12 of carrier D will engage and enter recess 49.

If leading edge 12 of carrier D drops slightly so as to first make contact with the arcuate edge 47, or is slightly elevated so as the first strike the edge 48, the separator edges will guide leading edge 12 of carrier D toward and into the recess 49. Due to the fact that carrier D and sheets N, P were initially inserted into the apparatus with leading edge 12 of carrier D projecting about one-quarter inch forwardly of the leading edge of negative sheet N, the latter does not make contact with separator 45 until after the following operation has occurred.

That is, continued movement of carrier D will cause its leading edge 12 to exert a thrust upon the separator 45. The direction of this thrust extends rearwardly and above shaft 46 so as to exert a torque upon separator 45 to rotate the latter upwardly in a counter-clockwise direction about shaft 46 as shown in FIG. 2

As separator 45 rotates upwardly in response to the thrust exerted by carrier D, the arcuate contour of edge 47 engages the lower surface of carrier D to cause the leading edge thereof to be raised outwardly of recess 49 and upwardly along the edge 48, to a position indicated by $D^1$ in FIG. 2. Separator 45 will have been rotated to the upward position before the leading edge of negative sheet N advances sufficiently to contact separator 45. The leading edge of negative sheet N then contacts the separator 45 on a lower edge 50 thereof and slides downwardly therealong.

It will thus be seen that carrier D and negative sheet N are separated by separator 45 which directs them in different directions. The edge 48 of separator 45 remains in contact with carrier D so as to hold separator 45 in its uppermost position while negative sheet N is passing beneath separator 45 in contact with lower edge 50 thereof. After the trailing edge of carrier D has passed the outer extremity of edge 48 separator 45 will be free to rotate in a clockwise direction down to its original normal position wherein the forward end 47a of surface 47 abuts cylinder 39.

Normally, separator 45 will also operate in the above described manner in response to the thrust exerted by a moving document alone. However, in processing very thin documents, such as air mail paper, it has been found that the document is not stiff enough under most circumstances to exert sufficient thrust on the separator to pivot the latter upwardly. In such an instance the document must be inserted within carrier D, which possesses a rigidity sufficient to exert the required thrust. Thus carrier D serves in a dual capacity as a carrier for short documents and as an actuator for the separator.

After leaving the separator 45, the leading edge 12 of carrier D travels upwardly and strikes the lower surface of the curved portion 30b of guide plate 30, which then guides carrier D around forwardly and downwardly between rollers 28, 35 and then outwardly of the machine through lower guideway 26a and lower inlet opening 26. After negative sheet N leaves separator 45 it is guided toward a developing tank (not shown).

While carrier D and negative sheet N are being subjected to the operation of the exposure means 39, 40 and the separator 45, the positive sheet P travels upwardly through guideway 32, and then arcuately around the upper portion of the latter and then downwardly through the exit end 32a thereof. Positive sheet P then passes between a drive roller 60 and a pair of idler rollers 61, only one of which is shown. Rollers 61 are rotatably mounted on a swinging support indicated generally by the reference numeral 62.

Support 62 has a back surface 63 leading to a downwardly rearwardly inclined surface 64. Positive sheet P after passing between drive roller 60 and idler rollers 61, is guided along rear surface 63 and surface 64 toward the developing tank which it enters simultaneously with negative sheet N.

It is to be understood that the specific embodiment of the invention shown in the drawings and described above is merely illustrative of one of the many forms which the invention may take in practice without departing from the scope of the invention as delineated in the appended claims which are to be interpreted as broadly as possible in view of the prior art.

I claim:

1. The combination of a photocopy machine having spaced rollers to effect movement and processing of a document of predetermined length and a carrier for conveying documents of length shorter than said predetermined length through said photocopy machine, said carrier comprising a pair of panels of thin flexible material and said panels being of substantially said predetermined length, at least one such panel being transparent, said panels having corresponding edges secured together to effect a reinforced common leading edge for entering into said machine, the trailing edges of said panels relative to the direction of movement into said machine being free and readily divergent from each other for sandwiching documents therebetween wherein said documents are of a length shorter than said predetermined length.

2. The combination of a photocopy machine having spaced rollers to effect movement and processing of a document of predetermined length and a carrier for conveying documents of length shorter than said predetermined length through said photocopy machine, said carrier comprising a pair of panels of thin flexible material and said panels being of substantially said predetermined length, at least one such panel being transparent, said panels having corresponding edges secured together to effect a reinforced common leading edge for entering into said machine, the trailing edges of said panels relative to the direction of movement into said machine being free and readily divergent from each other for sandwiching documents therebetween wherein said documents are of a length shorter than said predetermined length, said machine comprising an element to be engaged and actuated by said reinforced common leading edge of said carrier.

3. The combination of a photocopy machine having spaced rollers to effect movement and processing of a document of predetermined length and a carrier for conveying documents of length shorter than said predetermined length through said photocopy machine, said carrier comprising a pair of panels of thin flexible material and said panels being of substantially said predetermined length, at least one such panel being transparent, said panels having corresponding edges secured together to effect a reinforced common leading edge for entering into said machine, the trailing edges of said panels relative to the direction of movement into said machine being free and readily divergent from each other for sandwiching documents therebetween wherein said documents are of a length shorter than said predetermined length, said reinforcing common leading edge comprising a margin of said transparent panel folded over the corresponding edge of said other panel and being marginally secured thereto, one of said panels extending beyond the other at the trailing edge to effect a readily engageable margin for manual grasping and divergent separation of said panels at said trailing edges.

References Cited in the file of this patent

UNITED STATES PATENTS

| 777,097 | Herman | Dec. 13, 1904 |
| 2,182,325 | Tucker | Dec. 5, 1939 |
| 2,408,310 | Hassler | Sept. 24, 1946 |
| 2,522,804 | Shore | Sept. 19, 1950 |
| 2,652,757 | Robbins | Sept. 22, 1953 |

FOREIGN PATENTS

| 5,306 | Great Britain | of 1902 |